United States Patent
Kim et al.

(10) Patent No.: US 12,154,466 B2
(45) Date of Patent: *Nov. 26, 2024

(54) 3D HOLOGRAPHIC DISPLAY DEVICE AND OPERATING METHOD OF THE SAME

(71) Applicant: SAMSUNG ELECTRONICS CO., LTD., Suwon-si (KR)

(72) Inventors: Young Kim, Yongin-si (KR); Geunwoo Ko, Yongin-si (KR); Minsu Kim, Ansan-si (KR); Geeyoung Sung, Daegu (KR); Dongyeoul Lee, Suwon-si (KR); Sangbum Lee, Hwaseong-si (KR); Jonghyun Lee, Suwon-si (KR); Hongseok Lee, Seoul (KR); Punjae Choi, Yongin-si (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,678

(22) Filed: Nov. 14, 2023

(65) Prior Publication Data
US 2024/0078941 A1 Mar. 7, 2024

Related U.S. Application Data

(63) Continuation of application No. 17/500,098, filed on Oct. 13, 2021, now Pat. No. 11,854,443.

(30) Foreign Application Priority Data

Feb. 23, 2021 (KR) .................. 10-2021-0024232

(51) Int. Cl.
*G09G 3/32* (2016.01)
*G02B 30/34* (2020.01)
(Continued)

(52) U.S. Cl.
CPC ............ *G09G 3/001* (2013.01); *G02B 30/34* (2020.01); *G03H 1/2205* (2013.01);
(Continued)

(58) Field of Classification Search
CPC ......... G09G 3/001–003; G09G 3/2085; G09G 3/32–3291; G09G 3/34–3426;
(Continued)

(56) References Cited

U.S. PATENT DOCUMENTS 10,490,140 B2 11/2019 Kim et al.
10,606,071 B1 3/2020 Trail et al.
(Continued)

FOREIGN PATENT DOCUMENTS

KR 10-2017-0084951 A 7/2017
KR 10-2018-0052356 A 5/2018

OTHER PUBLICATIONS

Communication dated Jun. 24, 2022 issued by the European Patent Office in counterpart European Application No. 21218289.3.
(Continued)

*Primary Examiner* — Nathan Danielsen
(74) *Attorney, Agent, or Firm* — Sughrue Mion, PLLC

(57) ABSTRACT

A three-dimensional holographic display device includes a light emitting diode (LED) array including a plurality of light sources controlled to sequentially output light according to a preset pattern, a lens configured to refract light incident from the LED array, a spatial light modulator (SLM) configured to modulate light incident from the lens, and a processor configured to generate a plurality of holographic signals each comprising depth information adjusted according to an arrangement location of each of the plurality of light sources, and for each of the plurality of light sources, control the SLM to modulate the light based on a holographic signal corresponding to the light source.

20 Claims, 8 Drawing Sheets

(51) Int. Cl.
*G03H 1/22* (2006.01)
*G09G 3/00* (2006.01)

(52) U.S. Cl.
CPC ............. *G03H 1/2294* (2013.01); *G09G 3/32* (2013.01); *G03H 2222/34* (2013.01); *G09G 2320/064* (2013.01); *G09G 2330/08* (2013.01)

(58) Field of Classification Search
CPC ................... G09G 3/36; G09G 3/3607; G09G 3/3648–3696; G09G 2300/02–026; G09G 2310/04; G09G 2310/06; G09G 2310/08; G09G 2320/06; G09G 2320/0626; G09G 2320/064; G09G 2320/0646; G09G 2330/08; G06F 3/14; G06F 3/1446; G02B 30/34; G02B 30/36; G02B 30/40; G03H 1/22–2205; G03H 1/2286; G03H 1/2294; G03H 2001/221; G03H 2001/2223; G03H 2001/2234–2242; G03H 2001/2292; G03H 2001/2297; G03H 2222/34; G03H 2223/14; G03H 2223/17
See application file for complete search history.

(56) References Cited

U.S. PATENT DOCUMENTS

| | | |
|---|---|---|
| 10,788,727 B2 | 9/2020 | Kim et al. |
| 2005/0090875 A1 | 4/2005 | Palanker et al. |
| 2007/0230818 A1 | 10/2007 | Messing et al. |
| 2010/0141905 A1 | 6/2010 | Burke |
| 2011/0235145 A1 | 9/2011 | Futterer et al. |
| 2013/0050452 A1 | 2/2013 | Ramsey et al. |
| 2015/0378164 A1 | 12/2015 | Bailey et al. |
| 2016/0041384 A1 | 2/2016 | Robbins et al. |
| 2016/0189429 A1 | 6/2016 | Mallinson |
| 2017/0177075 A1 | 6/2017 | Zhang |
| 2017/0345398 A1 | 11/2017 | Fuchs et al. |
| 2018/0024628 A1 | 1/2018 | Kim et al. |
| 2020/0142355 A1 | 5/2020 | An et al. |
| 2020/0150588 A1 | 5/2020 | Seo et al. |
| 2020/0333609 A1 | 10/2020 | Leister et al. |
| 2020/0400953 A1 | 12/2020 | Hong et al. |
| 2021/0271067 A1 | 9/2021 | Tatsuta |

OTHER PUBLICATIONS

Minsik Park et al., "Digital Holographic Display System with Large Screen Based on Viewing Window Movement for 3D Video Service", Etri Journal, vol. 36, No. 2, Apr. 2014, XP055456037, 10 pages total.

FIG. 5
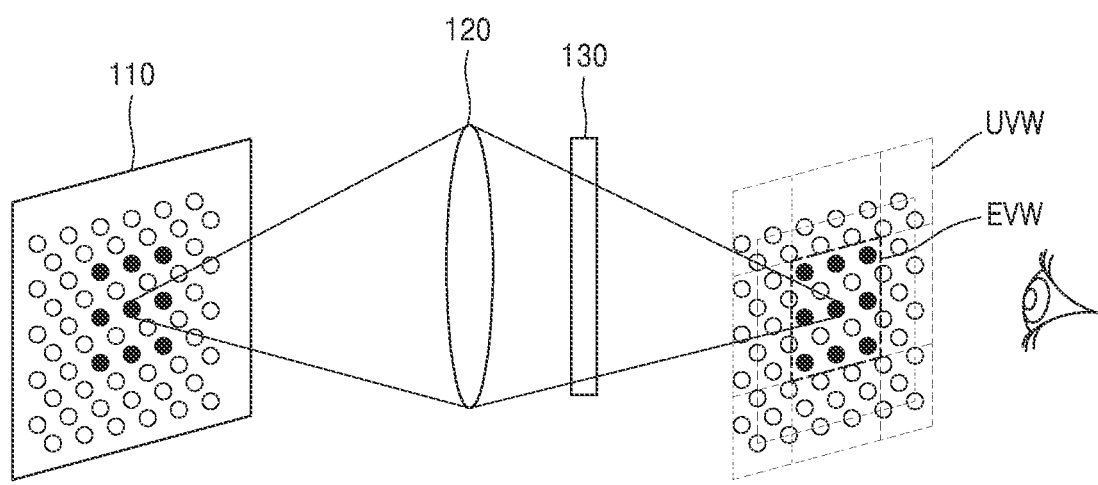
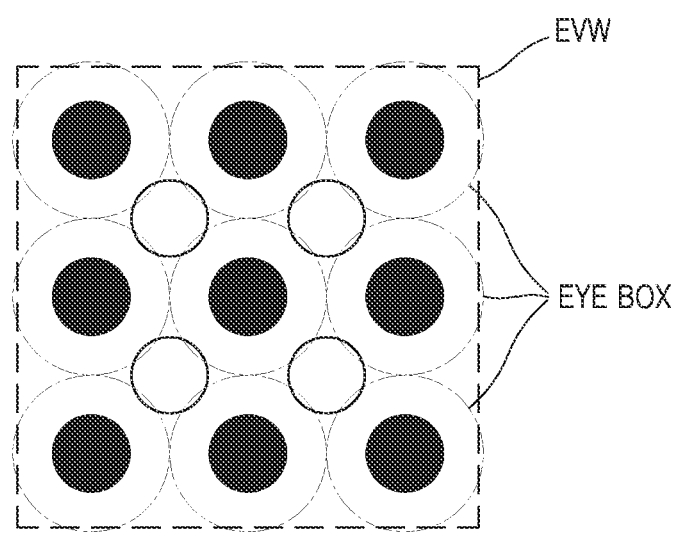

FIG. 6
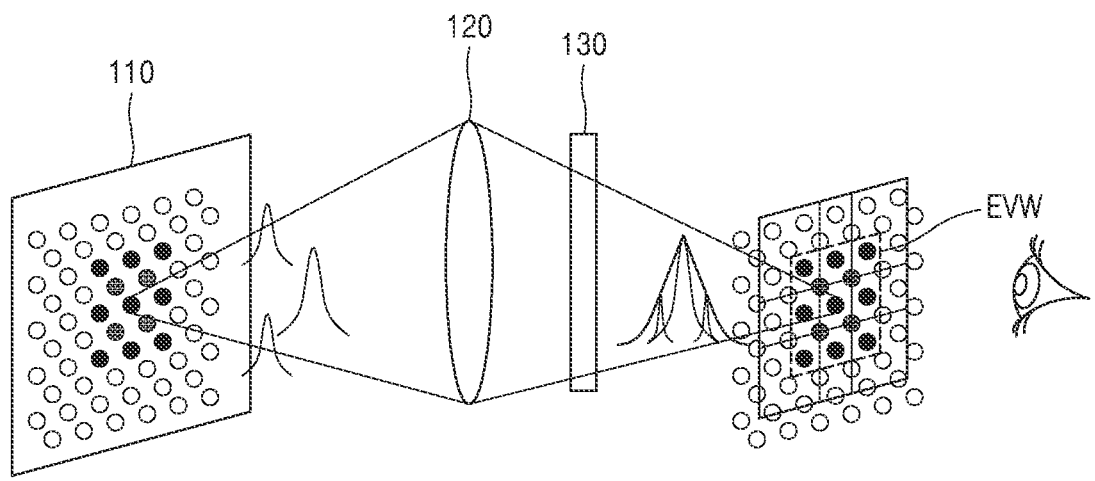
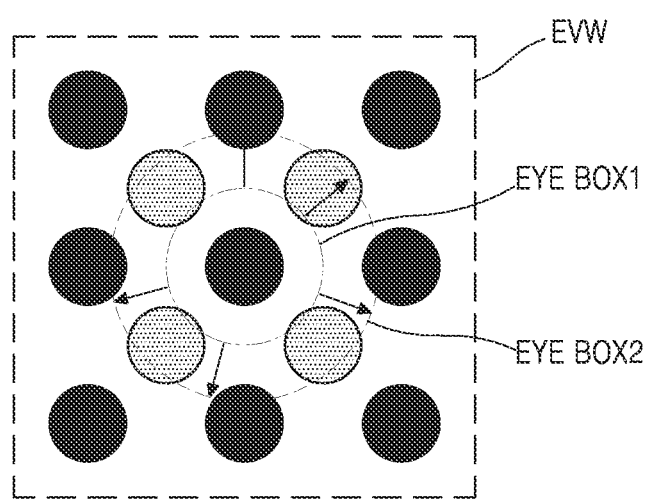

3D HOLOGRAPHIC DISPLAY DEVICE AND OPERATING METHOD OF THE SAME

CROSS-REFERENCE TO RELATED APPLICATION

This application is a continuation application of U.S. application Ser. No. 17/500,098, filed on Oct. 13, 2021, based on and claims priority under 35 U.S.C. § 119 to Korean Patent Application No. 10-2021-0024232, filed on Feb. 23, 2021, in the Korean Intellectual Property Office, the disclosure of which is incorporated by reference herein in its entirety.

BACKGROUND

1. Field

The disclosure relates to a three-dimensional holographic display device and an operating method of the same.

2. Description of Related Art

Three-dimensional holographic display devices may implement a high quality hologram in real time by using a spatial light modulator (SLM) capable of simultaneously controlling the amplitude and phase of light. As a three-dimensional holographic display device does not utilize binocular parallax unlike a stereoscopic display, the three-dimensional holographic display device may implement a real three-dimensional image that does not visually fatigue a user.

SUMMARY

Provided are a three-dimensional holographic display device and an operating method of the same. The technical objectives to be achieved by the disclosure are not limited to the above-described objectives, and other technical objectives may be inferred from the following example embodiments.

Additional aspects will be set forth in part in the description which follows and, in part, will be apparent from the description, or may be learned by practice of the example embodiments of the disclosure.

In accordance with an aspect of the disclosure, a three-dimensional holographic display device includes a light emitting diode (LED) array including a plurality of light sources controlled to sequentially output light according to a preset pattern; a lens configured to refract light incident from the LED array; a spatial light modulator (SLM) configured to modulate light incident from the lens; and a processor configured to generate a plurality of holographic signals each including depth information adjusted according to an arrangement location of each of the plurality of light sources; and for each of the plurality of light sources, control the SLM to modulate the light based on a holographic signal corresponding to the light source.

When a second light source of the plurality of light sources outputs light after a first light source of the plurality of light sources outputs light according to the preset pattern, the processor may change a holographic image pattern displayed by the SLM at a timing when the second light source starts outputting the light, and the changed holographic image pattern may be formed by a second holographic signal of the plurality of holographic signals, the second holographic signal including second depth information adjusted according to an arrangement location of the second light source.

The LED array may change a light source that outputs light, at a cycle of at least 1 MHz.

The three-dimensional holographic display device may further include a filter configured to remove a noise component of the light modulated by the SLM.

The processor may be further configured to drive the LED array in units of light source sets, each light source set including at least two light sources of the plurality of light sources.

For each of the light source sets, a distance between the at least two light sources in the light source set may be set such that holographic images displayed in a space respectively by the at least two light sources do not overlap each other.

For each of the light source sets, the processor may be further configured to adjust a brightness of at least some light sources among the at least two light sources in the light source set to be different from a brightness of other light sources in the light source set.

The processor may be further configured to, when it is determined that the at least two light sources in a light source set of the light source sets comprise a defective light source, adjust a brightness of light sources around the defective light source to compensate for a defect.

The LED array may include a first area including light sources of the plurality of light sources for displaying a first holographic image perceived by a left eye of a user and a second area including light sources of the plurality of light sources for displaying a second holographic image perceived by a right eye of the user.

The three-dimensional holographic display device may further include a driving device configured to move the LED array in at least one of a first direction, a second direction perpendicular to the first direction, and a third direction perpendicular to both of the first direction and the second direction, or rotate the LED array around at least one of the first direction, the second direction, and the third direction, as an axis.

In accordance with an aspect of the disclosure, a method of operating a three-dimensional holographic display device includes generating a plurality of holographic signals each including depth information adjusted according to an arrangement location of each of a plurality of light sources in a light emitting diode (LED) array; controlling the plurality of light sources to sequentially output light according to a preset pattern; and for each of the plurality of light sources, controlling a spatial light modulator (SLM) to modulate light incident from the LED array based on a holographic signal corresponding to the light source.

The method may further include, when a second light source of the plurality of light sources outputs light after a first light source of the plurality of light sources outputs light according to the preset pattern, changing a holographic image pattern displayed by the SLM at a timing when the second light source starts outputting the light, wherein the changed holographic image pattern is formed by a second holographic signal of the plurality of holographic signals, the second holographic signal including second depth information adjusted according to an arrangement location of the second light source.

The controlling of the plurality of light sources may include changing a light source that outputs light at a cycle of at least 1 MHz.

The method may further include removing a noise component of the light modulated by the SLM.

In the controlling of the plurality of light sources, the LED array may be driven in units of light source sets, each light source set including at least two light sources of the plurality of light sources.

For each of the light source sets, a distance between the at least two light sources in the light source set may be set such that holographic images displayed in a space respectively by the at least two light sources do not overlap each other.

The method may further include, for each of the light source sets, adjusting a brightness of at least some light sources among the at least two light sources in the light source set to be different from a brightness of other light sources in the light source set.

The method may further include, when it is determined that the at least two light sources in a light source set of the light source sets include a defective light source, adjusting a brightness of light sources around the defective light source to compensate for a defect.

The method may further include moving the LED array in at least one of a first direction, a second direction perpendicular to the first direction, and a third direction perpendicular to both of the first direction and the second direction, or rotating the LED array around at least one of the first direction, the second direction, and the third direction, as an axis.

A non-transitory computer-readable recording medium may have recorded thereon a program for executing the method of an above-noted aspect of the disclosure.

In accordance with an aspect of the disclosure, a holographic display device includes a plurality of light sources configured to be operated independently of each other; a spatial light modulator (SLM) that receives light emitted by the plurality of light sources; and a processor configured to turn on and off the plurality of light sources in a repeating sequence; and sequentially provide a plurality of signals to the SLM, each of the plurality of signals corresponding to a different step in the repeating sequence.

The holographic display device may be configured to form a holographic image at a plurality of viewing windows, each of the plurality of viewing windows corresponding to a different step in the repeating sequence.

A location of each of the plurality of viewing windows may correspond to a location of one or more light sources, of the plurality of light sources, that is turned on during the corresponding step in the repeating sequence.

BRIEF DESCRIPTION OF THE DRAWINGS

The above and other aspects, features, and advantages of example embodiments of the disclosure will be more apparent from the following description taken in conjunction with the accompanying drawings, in which:

FIG. 5 is a view of a process of implementing a multi-eye box by a three-dimensional holographic display device according to an embodiment;

FIG. 6 is a view of a process of extending an eye box by a three-dimensional holographic display device according to an embodiment;

DETAILED DESCRIPTION

Figure 1:
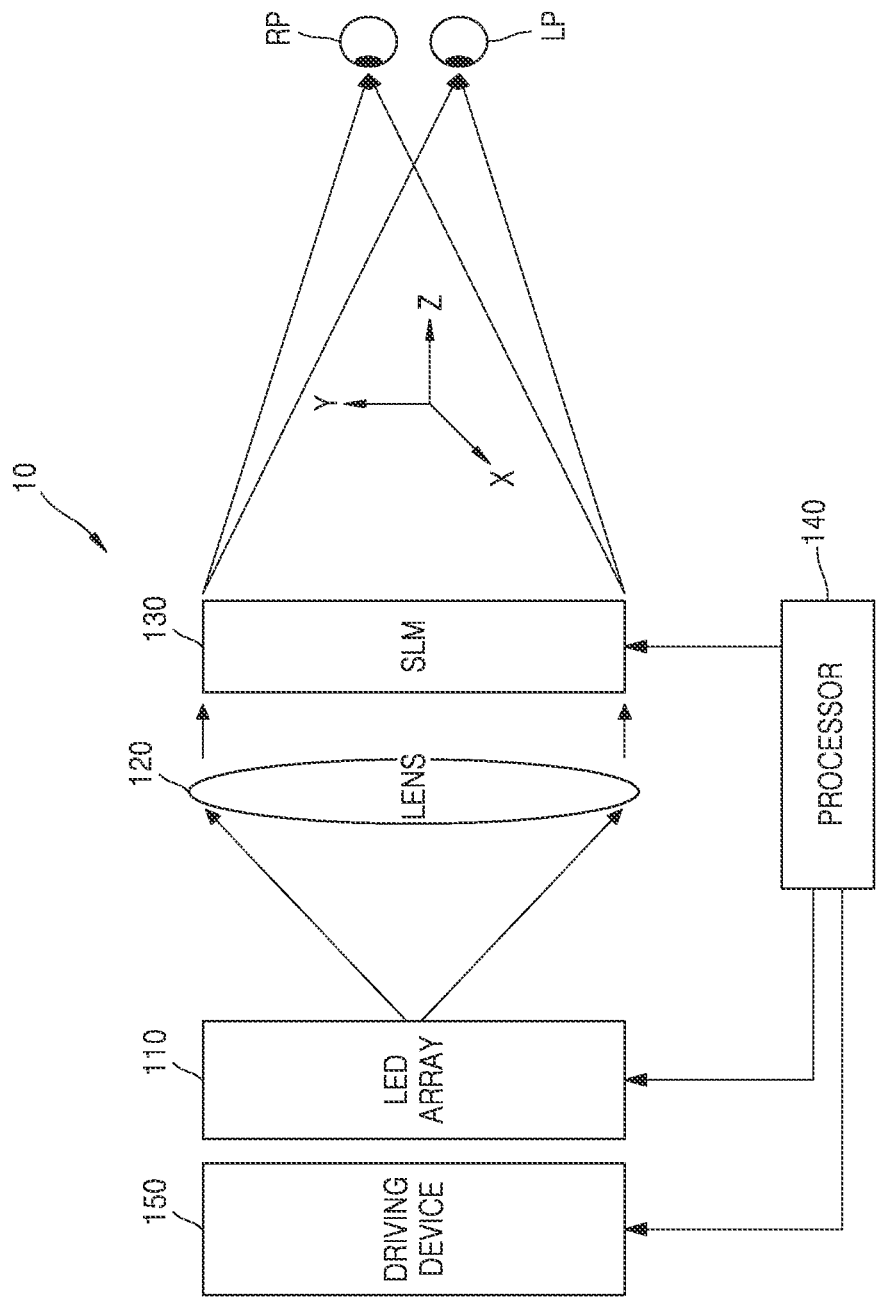
FIG. 1 is a view of a configuration of a three-dimensional holographic display device according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

In the specification, when a constituent element "connects" or is "connected" to another constituent element, the constituent element contacts or is connected to the other constituent element not only directly, but also electrically through at least one of other constituent elements interposed therebetween. The expression of singularity in the specification includes the expression of plurality unless clearly specified otherwise in context. Also, when a part may "include" a certain constituent element, unless specified otherwise, it may not be construed to exclude another constituent element but may be construed to further include other constituent elements.

Terms such as "include" or "comprise" may not be construed to necessarily include any and all constituent elements or steps described in the specification, but may be construed to exclude some of the constituent elements or steps or further include additional constituent elements or steps.

While such terms as "first," "second," etc., may be used to describe various components, such components must not be limited to the above terms. The above terms are used only to distinguish one component from another.

The description of the following embodiments should not be construed as limiting the scope of rights, and contents that can be easily inferred by those skilled in the art should be construed as belonging to the scope of the present specification. Hereinafter, example embodiments will be described in detail with reference to the accompanying drawings.

FIG. 1 is a view of a configuration of a three-dimensional holographic display device 10 according to an embodiment.

The three-dimensional holographic display device 10 may correspond to any electronic device capable of displaying a three-dimensional holographic image. For example, the three-dimensional holographic display device 10 may be applied to various electronic devices such as monitors, TVs, mobile display devices, and the like.

Referring to FIG. 1, the three-dimensional holographic display device 10 may include a light-emitting diode (LED) array 110, a lens 120, a spatial light modulator (SLM) 130, and a processor 140. However, only constituent elements related to embodiments are illustrated in the three-dimensional holographic display device 10 of FIG. 1. Accordingly, it is obvious to a person skilled in the art that general purpose constituent elements other than the constituent elements of FIG. 1 may be further included in the three-dimensional holographic display device 10. For example, the three-dimensional holographic display device 10 may further include a memory.

The memory is hardware for storing various pieces of data processed by the three-dimensional holographic display device 10. For example, the memory may store pieces of data processed or to be processed by the three-dimensional holographic display device 10. Furthermore, the memory may include applications, drivers, and the like to be driven by the three-dimensional holographic display device 10. In an example, the memory may store holographic signals generated by the processor 140.

The memory may include random access memory (RAM) such as dynamic random access memory (DRAM), static random access memory (SRAM), and the like, read-only memory (ROM), electrically erasable programmable ROM (EEPROM), a CD-ROM, a Blu-ray disk, or other optical disc storages, a hard disk drive (HDD), a solid state drive (SSD), or a flash memory, and furthermore, other external storage devices accessible by the three-dimensional holographic display device 10.

The LED array 110 may include a plurality of light sources that are individually controllable (e.g., may be operated independently of each other). For example, the LED array 110 may include a plurality of unit LEDs arranged in a two-dimensional array in row and column directions. Although FIG. 1 illustrates, as an embodiment, an example in which the three-dimensional holographic display device 10 includes the LED array 110, the LED array 110 may be replaced with a light source array including different types of light sources. For example, the LED array 110 may be replaced with an array of various light sources of a laser, a laser diode (LD), and the like.

The lens 120 may include one or more lenses for refracting incident light from the LED array 110 in a certain direction. For example, the lens 120 may include at least one of a collimating lens for collimating the incident light from the LED array 110 into parallel light and a focusing lens for focusing light on a specific point. For example, the lens 120 may include only a focusing lens, or both a collimating lens and a focusing lens. The collimating lens may include a cylindrical lens or cylindrical lens array, and the focusing lens may be manufactured as a diffractive optical element in which the phase of a lens is recorded on a plane, or a holographic optical element. However, the disclosure is not limited thereto.

Although FIG. 1 illustrates that the lens 120 is arranged in front of the SLM 130, the disclosure is not limited thereto. The lens 120 may be arranged at the rear of the SLM 130. Furthermore, when the lens 120 includes a plurality of lenses, some lenses may be arranged in front of the SLM 130, and the other lenses may be arranged at the rear of the SLM 130.

The SLM 130 may be a device capable of spatially converting light. The SLM 130 may be of a transmission type or a reflection type. In an example, the SLM 130 may include a liquid crystal on silicon (LCos) device or a liquid crystal display (LCD) device, but the disclosure is not limited thereto. The SLM 130 may control at least one of strength (amplitude), color, or phase of light exiting the SLM 130, and may include a matrix of a plurality of pixels that are individually controllable.

The processor 140 may perform an overall function of controlling the three-dimensional holographic display device 10. For example, the processor 140 may control operations of the LED array 110, the lens 120, and the SLM 130. The processor 140 may be implemented by an array of a plurality of logic gates, or a combination of a general purpose microprocessor and a memory storing a program that is executable by the microprocessor. Although FIG. 1 illustrates an example in which the processor 140 is provided separately from the SLM 130, the processor 140 may be included in the SLM 130.

The processor 140 may generate a holographic signal. The holographic signal may include a computer-generated hologram (CGH). To generate a CGH, a calculation method using a ray tracing method, a calculation method using a look-up table, a method using a fast Fourier transform, or the like may be used.

A holographic image pattern corresponding to the holographic signal generated by the processor 140 may be output by a plurality of pixels of the SLM 130, and an interference pattern of light rays may be generated in a space due to diffraction of light passing through a plurality of pixels of the SLM 130. A user may observe a three-dimensional holographic image from an interference pattern propagated to each of a left eye LP and a right eye RP. A process in which a user observes a three-dimensional holographic image is described below in detail with reference to FIG. 2.

Figure 2:
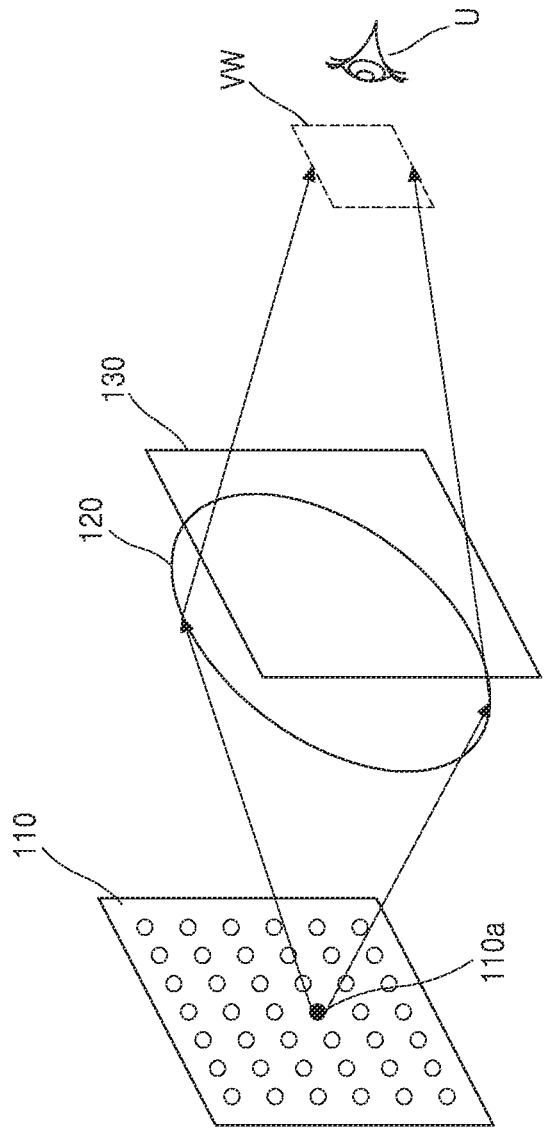
FIG. 2 is a view of a viewing window formed by the three-dimensional holographic display device of FIG. 1.

FIG. 2 is a view of a viewing window VW formed by the three-dimensional holographic display device 10 of FIG. 1.

Referring to FIG. 2, when a light source 110a included in the LED array 110 outputs light, a process in which a user U observes a three-dimensional holographic image is illustrated.

Light output from the light source 110a included in the LED array 110 may be refracted in a direction by passing through the lens 120. In an example of FIG. 2, as the lens 120 is a focusing lens, the light passing through the lens 120 may be focused toward a specific point in the space. The SLM 130 may reconfigure a holographic image in the space by modulating the amplitude and/or phase of light input through the lens 120.

However, a holographic image may be observed by the user U only in a field of vision due to a condition such as the characteristics of the lens 120, the pixel size of the SLM 130, and the like. As such, to the pupil of the user U, a field of vision for observing a holographic image may be referred to as a viewing window VW.

When the location of the pupil of the user U is out of the viewing window VW, a holographic image is not perceived by the user U and thus there is a movement restriction for the user U to continuously observe the holographic image. According to the related art, a method of continuously tracking the location of the pupil of the user U by using a separate sensor, and performing movement of the location of the viewing window VW to fit to the tracked location of the pupil has been proposed. However, as the size of the viewing window VW is similar to the size of the pupil, which is merely about 3 mm to 8 mm, according to the related art, for accurate matching, a sensor having high precision, a processor capable of performing a fast calculation, and the like are necessary.

The three-dimensional holographic display device according to the disclosure proposes a technology that reduces a restriction in the movement of the user U even when the location of the pupil of the user U is not continuously tracked by using a separate sensor. A process of operating the three-dimensional holographic display device according to the disclosure is described below in detail with reference to FIG. 3.

Figure 3:
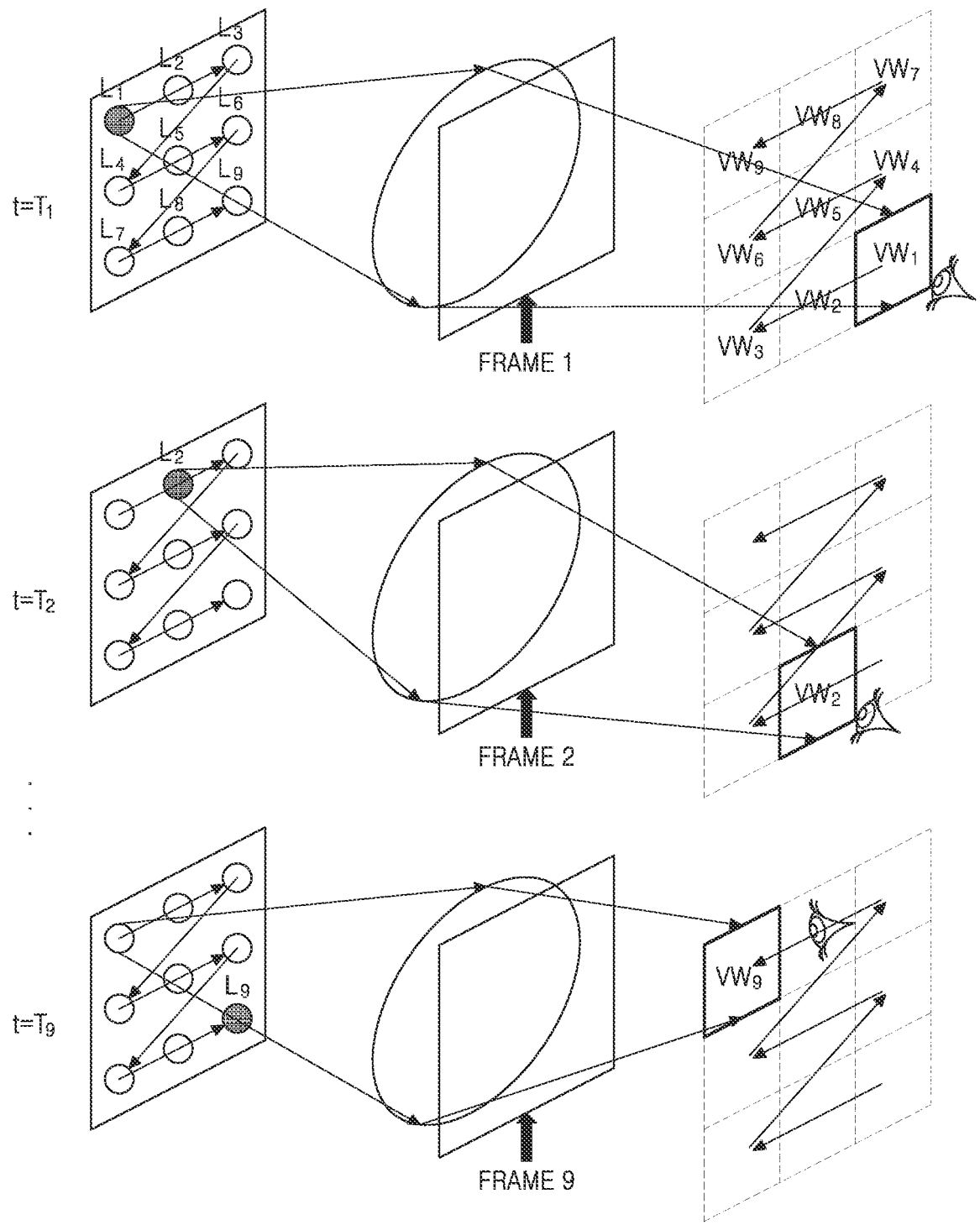
FIG. 3 is a view of an operation of a three-dimensional holographic display device according to an embodiment.

FIG. 3 is a view of an operation of a three-dimensional holographic display device according to an embodiment.

Referring to FIG. 3, an example of an LED array, for example, the LED array 110 of FIGS. 1 and 2, including a plurality of light sources $L_1$ to $L_9$ is illustrated. Although, for convenience of explanation, a case in which the number of light sources is nine is illustrated in FIG. 3, the number of light sources is not limited to the above example. The number of light sources may be more or less than nine. In FIG. 3, a light source shown as a black circle denotes a state in which light is output, and a light source shown as a white circle (or blank circle) denotes a state in which light is not output.

A plurality of light sources, for example, the light sources $L_1$ to $L_9$, included in an LED array may be controlled to sequentially output light according to a preset pattern. For example, as illustrated in FIG. 3, after the light source $L_1$ outputs light, the light source $L_2$ may output light, and after the light source $L_2$ outputs light, the light source $L_3$ may output light. After the light source $L_9$ outputs light in the same sequence, the light source $L_1$ may output light again. However, this is merely an example, and the light sources $L_1$ to $L_9$ may be controlled to sequentially output light according to a different pattern. For example, the light sources $L_1$ to $L_9$ may output light in a reverse order of the pattern of FIG. 3, or in an order of a certain or preset pattern.

A processor, for example, the processor 140 of FIGS. 1 and 2, may generate a plurality of holographic signals each having depth information adjusted according to the arrangement location of each of a plurality of light sources, for example, the light sources $L_1$ to $L_9$, and control an SLM, for example, the SLM 130 of FIGS. 1 and 2, to modulate light based on the holographic signal corresponding to a light source currently outputting light among the generated holographic signals. In other words, the processor 140 may turn on and off the plurality of light sources in a repeating sequence and may sequentially provide a plurality of signals to the SLM 130 such that each of the plurality of signals corresponds to a different step in the repeating sequence.

As the location of the light source that outputs light is changed, the location of the viewing window may be changed so that a viewpoint that a user views a holographic image may be changed. In other words, a holographic image may be formed at a plurality of viewing windows such that each of the plurality of viewing windows corresponds to a different step in the repeating sequence. Further, a location of each of the plurality of viewing windows may correspond to a location of a light source that is turned on during the corresponding step in the repeating sequence. For example, as the light source that outputs light is changed from the light source $L_1$ to the light source $L_2$, the location of a viewing window may be changed from a viewing window $VW_1$ to a viewing window $VW_2$ as shown in FIG. 3. As such, the location of a viewing window may be changed in a direction symmetrical to a direction in which the location of a light source is moved, with respect to a center of a lens, for example, the lens 120 of FIGS. 1 and 2, and the location and/or angle of the pupil of the user to perceive a holographic image may be changed. Accordingly, for the user to correctly observe a desired holographic image, the depth information of a holographic signal may be appropriately adjusted.

When a second light source outputs light after a first light source outputs light according to a preset pattern, the processor may change a holographic image pattern displayed by the SLM at a timing when the second light source starts outputting light. A changed holographic image pattern may be formed by a holographic signal (e.g., a second holographic signal) having depth information (e.g., second depth information) adjusted according to the arrangement location of the second light source. In an example, when the light source $L_2$ outputs light after the light source $L_1$ outputs light, the processor may change the holographic image pattern output by the SLM from Frame 1 to Frame 2. Frame 1 may have depth information adjusted considering the location of the viewing window $VW_1$ formed according to the location of the light source $L_1$ that outputs light, and Frame 2 may have depth information adjusted considering the location of the viewing window $VW_2$ formed according to the location of the light source $L_2$ that outputs light.

When the light source $L_2$ starts outputting light directly after the light source $L_1$ stops outputting light, a time when the light source starts outputting light and a time when a displayed holographic image pattern is changed by the SLM may be completely synchronized with each other. However, the disclosure is not limited thereto, and when the light source $L_2$ starts outputting light with a certain time interval after the light source $L_1$ stops outputting light, a time when the light source starts outputting light and a time when the holographic image pattern is changed do not need to be completely synchronized with each other, and the holographic image pattern may be changed before or simultaneously when the light source starts outputting light.

As such, as a plurality of light sources, for example, the light sources $L_1$ to $L_9$, included in the LED array may be controlled to sequentially output light according to a preset pattern, for example, in an order of $L_1, L_2, \ldots, L_9$, and the SLM may modulate the light based on a holographic signal corresponding to a light source that outputs light at a specific time, the location of a viewing window, which enables the user to normally perceive a holographic image, may be continuously changed.

When the LED array and the SLM are driven at a high enough speed, even when the pupil of the user is located at any of a plurality of viewing windows, for example, the viewing windows $VW_1$ to $VW_9$, respectively corresponding to a plurality of light sources, for example, the light sources $L_1$ to $L_9$, at a specific time, the user may observe a holographic image. In other words, according to the operating process of the three-dimensional holographic display device of FIG. 3, compared with a case of FIG. 2 in which a single light source, that is, the light source 110a, continuously outputs light, the size of an area where a holographic image is observed may be extended in proportion to the number of light sources. Accordingly, even when the location of the pupil of the user is moved within the extended area, the user may continuously observe a holographic image. When the number of light sources is sufficiently large, the user may not substantially feel restricted in movement.

To prevent the user from feeling a sense of difference according to the movement of a viewing window, the LED array and the SLM may be driven at a high enough speed. For example, the LED array may change, at least at a cycle of about 1 MHz, the light source that outputs light. As illustrated in FIG. 3, when the light source $L_1$ starts outputting light at a point $T_1$, and the light source $L_2$ starts outputting light at a point $T_2$, a cycle T of changing the light source that outputs light may be $T=T_2-T_1=(1\ MHz)^{-1}=10^{-6}$ seconds. However, the disclosure is not limited thereto, and the LED array may change the light source that outputs light, at a cycle of several hundreds to thousands of hertz or more. The SLM may have a driving speed corresponding to the driving speed of the LED array.

Although FIG. 3 illustrates an example in which a plurality of viewing windows respectively corresponding to a plurality of light sources do not overlap each other, the viewing windows may overlap each other according to the size and brightness of each of the light sources, a distance between adjacent light sources, and the like. When the viewing windows overlap each other, in some cases, a holographic image corresponding to one viewing window may appear to overlap a holographic image corresponding to another viewing window. Furthermore, an afterimage of a holographic image may be seen due to the high speed driving of the LED array and the SLM holographic image. In the following description, various methods of observing a normal holographic image by a user are described in detail with reference to FIGS. 4 to 6.

Figure 4:
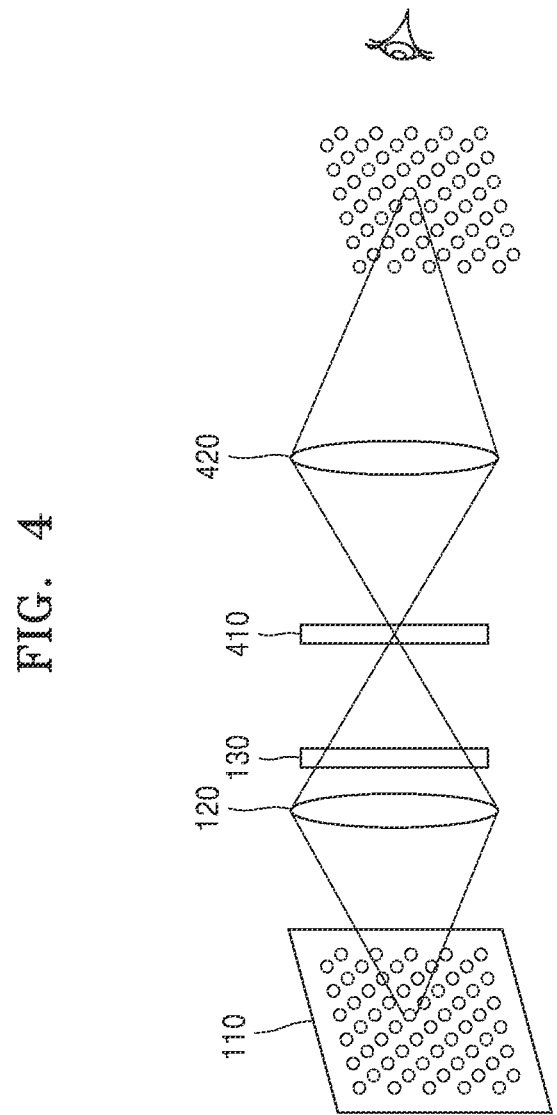
FIG. 4 is a view of a configuration of a three-dimensional holographic display device according to an embodiment.

FIG. 4 is a view of a configuration of a three-dimensional holographic display device according to an embodiment.

Referring to FIG. 4, the three-dimensional holographic display device, for example, the three-dimensional holographic display device 10 of FIG. 1, may further include a filter 410 and an additional lens 420, in addition to the LED array 110, the lens 120, and the SLM 130. As the same description as the lens 120 is applied to the additional lens 420, a redundant description thereof is omitted.

The filter 410 may remove a noise component of light modulated by the SLM 130. As the filter 410 removes the noise component, an afterimage of a holographic image generated due to the high speed driving of the LED array 110 and the SLM 130 may be removed. The filter 410 may dynamically change the filtering characteristics of removing a noise component. In an example, the filter 410 may change filtering characteristics at a high enough speed to remove the afterimage of a holographic image caused by the high speed driving of the LED array 110 and the SLM 130.

FIG. 5 is a view of a process of implementing a multi-eye box by a three-dimensional holographic display device according to an embodiment.

In FIG. 5, a light source shown as a black circle denotes a state in which light is output, and a light source shown as a white circle denotes a state in which light is not output. Furthermore, in FIG. 5, it is assumed that a distance between the LED array 110 and the lens 120 is the same as a distance between the lens 120 and an observation area, and the size of the observation area is illustrated to be close to a ratio of 1:1 in relation to the LED array 110. However, a person skilled in the art would easily understand that the size of an area of a viewing window may be changed according to the ratio between the distance between the LED array 110 and the lens 120 and the distance between the lens 120 and the observation area.

A processor, for example, the processor 140 of FIGS. 1 and 2, may drive the LED array 110 in units of light source sets, each light source set including at least two light sources. For example, as illustrated in FIG. 5, the processor may drive the LED array 110 in units of sets of nine light sources. In other words, the processor may control nine light sources included in one light source set to simultaneously output light, and then nine light sources included in another light source set to simultaneously output light.

The size of a unit viewing window (UVW) corresponding to one light source is limited by the pixel size of the SLM 130. However, when a set of nine light sources simultaneously outputs light, viewing windows respectively corresponding to the nine light sources may be overlapped with each other. Accordingly, an intersection of sets of viewing windows may form an effective viewing window EVW in which noise is not present. A multi-eye box may be implemented in an area corresponding to the effective viewing window EVW.

An eye box, which is an area that is actually taken by a holographic image among the area in a viewing window, may mean an area including image information of the SLM 130. When the eye box is located at the pupil of the user, the user may observe a holographic image. The processor may form the effective viewing window EVW by controlling a light source set including at least two light sources to simultaneously output light, and thus, a plurality of eye boxes may be formed in the effective viewing window EVW. In other words, the user may observe a holographic image at various locations corresponding to the eye boxes in the effective viewing window EVW.

Although FIG. 5 illustrates an example in which nine eye boxes are included in the effective viewing window EVW, the number of eye boxes in the effective viewing window EVW may vary according to the size of a holographic image, the size and brightness of each of a plurality of light sources, the distance between adjacent light sources, and the like. The distance between at least two light sources included in a light source set may be set such that holographic images displayed in the space by each of at least two light sources do not overlap each other. However, the disclosure is not limited thereto.

According to the embodiment of FIG. 5, as the processor drives the LED array 110 in units of light source sets, each light source set including at least two light sources, as described with reference to FIG. 3, high speed scanning of viewing windows may be performed in units of effective viewing windows EVWs.

FIG. 6 is a view of a process of extending an eye box by a three-dimensional holographic display device according to an embodiment.

In FIG. 6, a light source shown as a black circle denotes a state in which light is output, and a light source shown as a white circle denotes a state in which light is not output. Furthermore, in the bottom portion of FIG. 6, a light source shown as a circle including a pattern inside denotes a state in which light is output at a brightness lower than the light of the light source shown as a black circle. In FIG. 6, it is assumed that the distance between the LED array 110 and the lens 120 is the same as the distance between the lens 120 and the observation area, and the size of the observation area is illustrated to be close to a ratio of 1:1 in relation to the LED array 110. However, a person skilled in the art would easily understand that the size of an area of a viewing window may be changed according to the ratio between the distance between the LED array 110 and the lens 120 and the distance between the lens 120 and the observation area.

A processor, for example, the processor 140 of FIGS. 1 and 2, may drive the LED array 110 in units of light source sets, each light source set including at least two light sources. Furthermore, the processor may adjust the brightness of at least some of the at least two light sources included in a light source set to be different from the brightness of the other light sources. For example, as illustrated in FIG. 6, the processor may control four light sources in addition to the nine light sources that are controlled as shown in FIG. 5 to additionally output light. The brightness of the four light sources may be controlled to be lower than that of the nine light sources.

When the size of a unit light source is too small, as the size of an eye box formed at a viewing position decreases to be smaller than the size of the pupil of the user, it may be difficult for the user to normally observe a holographic image. In this case, the processor controls additional light sources, for example, the four light sources of a medium brightness in FIG. 6, to simultaneously output light, so that the size of an eye box itself may be extended. For example, when the size of an existing eye box (EYE BOX1) of FIG. 6 is smaller than that of the pupil of the user, as four light sources are additionally controlled, the size of a new eye box (EYE BOX2) may be increased to be greater than the size of the pupil of the user.

Furthermore, as the processor appropriately adjusts the brightness of each of a plurality of light sources, a holographic image may be calibrated. For example, as the processor maximizes the brightness of a main light source while appropriately adjusting the brightness of light sources located around the main light source, a holographic image of high resolution may be provided to the user. Furthermore, when it is determined that at least two light sources included in a light source set include a defective light source, the processor may adjust the brightness of light sources around the defective light source to compensate for the defect.

Figure 7:
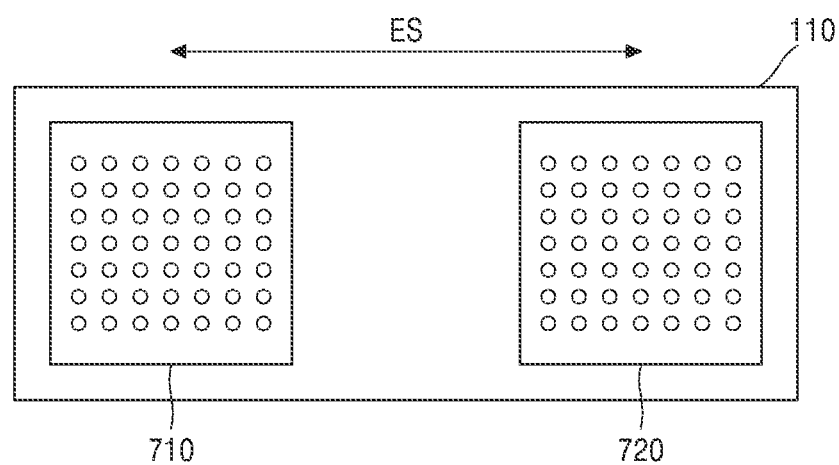
FIG. 7 is a view of a configuration of an LED array according to an embodiment.

FIG. 7 is a view of a configuration of an LED array according to an embodiment.

Referring to FIG. 7, the LED array 110 may include a first area 710 corresponding to light sources for displaying a holographic image (e.g., a first holographic image) perceived by a left eye of the user and a second area 720 corresponding to light sources for displaying a holographic image (e.g., a second holographic image) perceived by a right eye of the user. Each of the first area 710 and the second area 720 may be driven based on various operating methods of the above-described 3D holographic display device.

When the distance between the LED array 110 and a lens, for example, the lens 120 of FIG. 1, is the same as the distance between the lens and a viewing position of the user, a distance ES between the first area 710 and the second area 720 may be about 65 mm, which is an average binocular spacing of a user. However, the disclosure is not limited thereto, and the distance ES between the first area 710 and the second area 720 may be appropriately set according to the focal length of a lens and the like. A processor, for example, the processor 140 of FIGS. 1 and 2, may assign at least some of the light sources included in the LED array 110 to the first area 710, and the other light sources to the second area 720, and thus, the distance ES between the first area 710 and the second area 720 may be easily adjusted.

Referring back to FIG. 1, the three-dimensional holographic display device 10 may further include a driving device 150 that moves the LED array 110 in at least one of a first direction, a second direction perpendicular to the first direction, and a third direction perpendicular to both of the first direction and the second direction, or rotates the LED array 110 around at least one of the first direction, the second direction, and the third direction, as an axis. For example, in the viewpoint of facing the LED array 110 from the front side, the driving device 150 may move the LED array 110 in at least one of a vertical direction, a horizontal direction, and a depth direction, or rotate the LED array 110 around at least one of the vertical direction, the horizontal direction, and the depth direction, as an axis.

As described above with reference to FIG. 3, even when the observation area is extended through the high speed driving of the LED array 110 and the SLM 130, when the user is located outside the extended observation area, the three-dimensional holographic display device 10 may change the location of the LED array 110 by using the driving device 150. Accordingly, the observation area may be additionally extended. For example, fine tuning of the observation area may be achieved by the control of the light sources included in the LED array 110, and tuning in a large scale may be achieved by the control of the driving device 150. Furthermore, when the LED array 110 includes a defective light source, the driving device 150 may replace the defective light source with another light source by moving the LED array 110.

Figure 8:
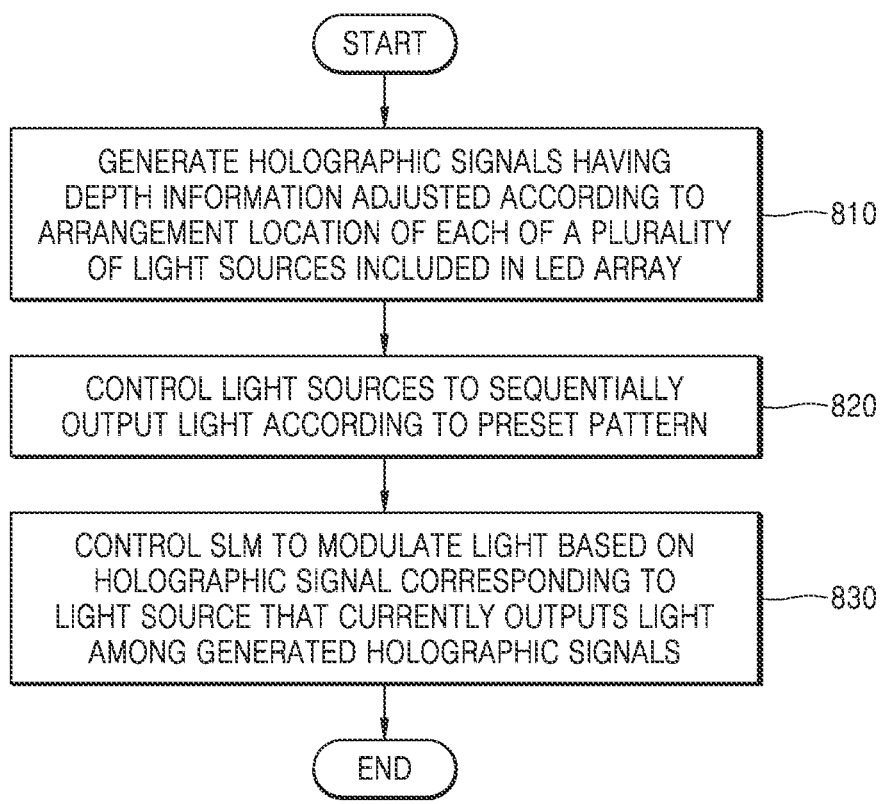
FIG. 8 is a flowchart of a method of operating a three-dimensional holographic display device, according to an embodiment.

FIG. 8 is a flowchart of a method of operating a three-dimensional holographic display device, according to an embodiment.

Referring to FIG. 8, the method of operating a three-dimensional holographic display device may include operations that are processed in a time series in the three-dimensional holographic display device 10 of FIG. 1. Accordingly, it may be seen that the above descriptions given with reference to FIGS. 1 to 7, although omitted below, may be applied to the method of operating a three-dimensional holographic display device of FIG. 8.

In operation 810, the three-dimensional holographic display device may generate holographic signals having depth information adjusted according to the arrangement location of each of a plurality of light sources included in an LED array. A holographic signal may include a CGH.

In operation 820, the three-dimensional holographic display device may control the light sources to sequentially output light according to a preset pattern. In an example, the three-dimensional holographic display device may change a light source that outputs light at a cycle of at least 1 MHz. However, the disclosure is not limited thereto.

In operation 830, the three-dimensional holographic display device may control an SLM to modulate light based on a holographic signal corresponding to a light source that currently outputs light among the generated holographic signals. As the location of the light source that outputs light is changed, the location of a viewing window may be changed, and a viewpoint in which a holographic image is visible may be changed. Accordingly, depth information of a holographic signal is appropriately adjusted for a user to appropriately observe an intended holographic image.

Accordingly, when a second light source outputs light after a first light source outputs light according to a preset pattern, the three-dimensional holographic display device may change a holographic image pattern displayed by the SLM, at a timing when the second light source starts outputting light. The changed holographic image pattern may be formed by a holographic signal having depth information adjusted according to the arrangement location of the second light source.

The operations of FIG. 8 may not necessarily be performed in the described order. For example, operation 810 may be previously performed before operation 820 and operation 830 are performed, and may be substantially and simultaneously performed with operation 820 and operation 830. Although operation 820 and operation 830 correspond to operations that are performed together, specific start timings of the respective operations may not be completely matched. Furthermore, operation 810 may be performed only once at the beginning, and operation 820 and operation 830 only may be repeated. However, the disclosure is not limited thereto, and all operations may be repeatedly performed.

The three-dimensional holographic display device may remove a noise component of light modulated by the SLM. For example, as the three-dimensional holographic display device additionally includes a noise filter at the rear of the SLM, the noise component of the light modulated by the SLM may be removed.

The three-dimensional holographic display device may drive an LED array in units of light source sets, each light source set including at least two light sources. In an example, the distance between at least two light sources included in a light source set may be set such that holographic images displayed in a space respectively by at least two light sources do not overlap each other. However, the disclosure is not limited thereto.

In an example, the three-dimensional holographic display device may adjust the brightness of at least some of at least two light sources included in a light source set to be different from the brightness of other light sources. When the size of a unit light source is too small, the size of an eye box formed at a viewing position decreases to be smaller than the size of a pupil of a user, and thus it may be difficult for the user to normally observe a holographic image. In this case, as the three-dimensional holographic display device maximizes the brightness of a main light source while appropriately adjusting the brightness of light sources located around the main light source, the size of an eye box may be extended.

Furthermore, when it is determined that at least two light sources included in a light source set include a defective light source, the three-dimensional holographic display device may adjust the brightness of light sources around the defective light source to compensate for the defect.

According to an embodiment, the three-dimensional holographic display device may move an LED array in at least one of a first direction, a second direction perpendicular to the first direction, and a third direction perpendicular to both of the first direction and the second direction, or rotate the LED array around at least one of the first direction, the second direction, and the third direction, as an axis The above-described method of operating a three-dimensional holographic display device may be recorded on a computer-readable recording medium having recorded thereon one or more programs including instructions for executing the method. Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware devices configured to store and execute program commands, for example, programming modules, e.g., read only memories (ROMs), random access memories (RAMs), flash memories. Also, the program command may include not only machine code created by a compiler but also high-level programming language executable by a computer using an interpreter.

The description of the following embodiments should not be construed as limiting the scope of rights, and contents that can be easily inferred by those skilled in the art should be construed as belonging to the scope of the present specification.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A three-dimensional holographic display device comprising:
   a light emitting diode (LED) array comprising a plurality of light sources, wherein the plurality of light sources comprise a plurality of light source sets, each of the plurality of light source sets comprising at least two light sources among the plurality of light sources;
   a lens configured to refract light incident from the LED array;
   a spatial light modulator (SLM) configured to modulate light incident from the lens; and
   a processor configured to:
      control the plurality of light source sets in a unit of light source set to sequentially output light according to a preset repeating pattern;
      generate a plurality of holographic signals each comprising depth information adjusted according to an arrangement location of each of the plurality of light source sets in the LED array; and
      for each of the plurality of light source sets, control the SLM to modulate the light based on a holographic signal corresponding to a light source set of the plurality of light source sets.

2. The three-dimensional holographic display device of claim 1, wherein, when a second light source set of the plurality of light source sets outputs light after a first light source set of the plurality of light source sets outputs light according to the preset repeating pattern, the processor changes a holographic image pattern formed by a first holographic signal of the plurality of holographic signals and displayed by the SLM at a timing when the second light source set starts outputting the light, and
   wherein the changed holographic image pattern is formed by a second holographic signal of the plurality of holographic signals, the second holographic signal comprising depth information adjusted according to an arrangement location of the second light source set in the LED array.

3. The three-dimensional holographic display device of claim 1, further comprising a filter configured to remove a noise component of the light modulated by the SLM.

4. The three-dimensional holographic display device of claim 1, wherein for each of the plurality of light source sets, a distance between the at least two light sources in the light source set is set such that holographic images displayed in a space respectively by the at least two light sources do not overlap each other.

5. The three-dimensional holographic display device of claim 1, wherein for each of the plurality of light source sets, the processor is further configured to adjust a brightness of at least some light sources among the at least two light sources in the light source set to be different from a brightness of other light sources in the light source set.

6. The three-dimensional holographic display device of claim 1, wherein the processor is further configured to, when it is determined that the at least two light sources in a light source set of the plurality of light source sets comprise a defective light source, adjust a brightness of light sources around the defective light source to compensate for a defect.

7. The three-dimensional holographic display device of claim 1, wherein the LED array comprises a first area comprising light sources of the plurality of light sources for displaying a first holographic image perceived by a left eye of a user and a second area comprising light sources of the plurality of light sources for displaying a second holographic image perceived by a right eye of the user.

8. The three-dimensional holographic display device of claim 1, further comprising a driving device configured to move the LED array in at least one of a first direction, a second direction perpendicular to the first direction, and a third direction perpendicular to both of the first direction and the second direction, or rotate the LED array around at least one of the first direction, the second direction, and the third direction, as an axis.

9. A method of operating a three-dimensional holographic display device, the method comprising:
generating a plurality of holographic signals each comprising depth information adjusted according to an arrangement location of each of a plurality of light source sets in a light emitting diode (LED) array, wherein the LED array comprises a plurality of light sources and the plurality of light sources comprise the plurality of light source sets, each of the plurality of light source sets comprising at least two light sources among the plurality of light sources;
controlling all of the plurality of light source sets in a unit of light source set to sequentially output light according to a preset repeating pattern; and
for each of the plurality of light source sets, controlling a spatial light modulator (SLM) to modulate light incident from the LED array based on a holographic signal corresponding to a light source set of the plurality of light source sets.

10. The method of claim 9, further comprising, when a second light source set of the plurality of light source sets outputs light after a first light source set of the plurality of light source sets outputs light according to the preset repeating pattern, changing a holographic image pattern formed by a first holographic signal of the plurality of holographic signals and displayed by the SLM at a timing when the second light source set starts outputting the light,
wherein the changed holographic image pattern is formed by a second holographic signal of the plurality of holographic signals, the second holographic signal comprising depth information adjusted according to an arrangement location of the second light source set in the LED array.

11. The method of claim 9, further comprising removing, by a filter of the three-dimensional holographic display device, a noise component of the light modulated by the SLM.

12. The method of claim 9, wherein for each of the plurality of light source sets, a distance between the at least two light sources in the light source set is set such that holographic images displayed in a space respectively by the at least two light sources do not overlap each other.

13. The method of claim 9, further comprising, for each of the plurality of light source sets, adjusting a brightness of at least some light sources among the at least two light sources in the light source set to be different from a brightness of other light sources in the light source set.

14. The method of claim 9, further comprising, when it is determined that the at least two light sources in a light source set of the plurality of light source sets comprise a defective light source, adjusting a brightness of light sources around the defective light source to compensate for a defect.

15. The method of claim 9, further comprising moving the LED array in at least one of a first direction, a second direction perpendicular to the first direction, and a third direction perpendicular to both of the first direction and the second direction, or rotating the LED array around at least one of the first direction, the second direction, and the third direction, as an axis.

16. A non-transitory computer-readable recording medium having recorded thereon a program for executing the method of claim 9.

17. A holographic display device comprising:
a plurality of light sources comprising a plurality of light source sets configured to be operated independently of each other, wherein each of the plurality of light source sets comprising at least two light sources among the plurality of light sources;
a spatial light modulator (SLM) that receives light emitted by the plurality of light source sets; and
a processor configured to:
turn on and off all of the plurality of light source sets in a unit of light source set in a preset repeating sequence; and
sequentially provide a plurality of signals to the SLM, each of the plurality of signals corresponding to a different step in the preset repeating sequence and having depth information adjusted according to an arrangement location of each of the plurality of light source sets in the plurality of light sources.

18. The holographic display device of claim 17, wherein the holographic display device is configured to form a holographic image at a plurality of viewing windows, each of the plurality of viewing windows corresponding to a different step in the repeating sequence.

19. The holographic display device of claim 18, wherein a location of each of the plurality of viewing windows corresponds to a location of one or more light sources, of the plurality of light sources, that is turned on during the corresponding step in the repeating sequence.

20. The holographic display device of claim 17, wherein when a second light source set of the plurality of light source sets outputs light after a first light source set of the plurality of light source sets outputs light according to the preset repeating sequence, the processor changes a holographic image pattern formed by a first signal of the plurality of signals and displayed by the SLM at a timing when the second light source set starts outputting the light, and
wherein the changed holographic image pattern is formed by a second signal of the plurality of signals, the second signal comprising depth information adjusted according to an arrangement location of the second light source set in the plurality of light sources.

* * * * *